UNITED STATES PATENT OFFICE.

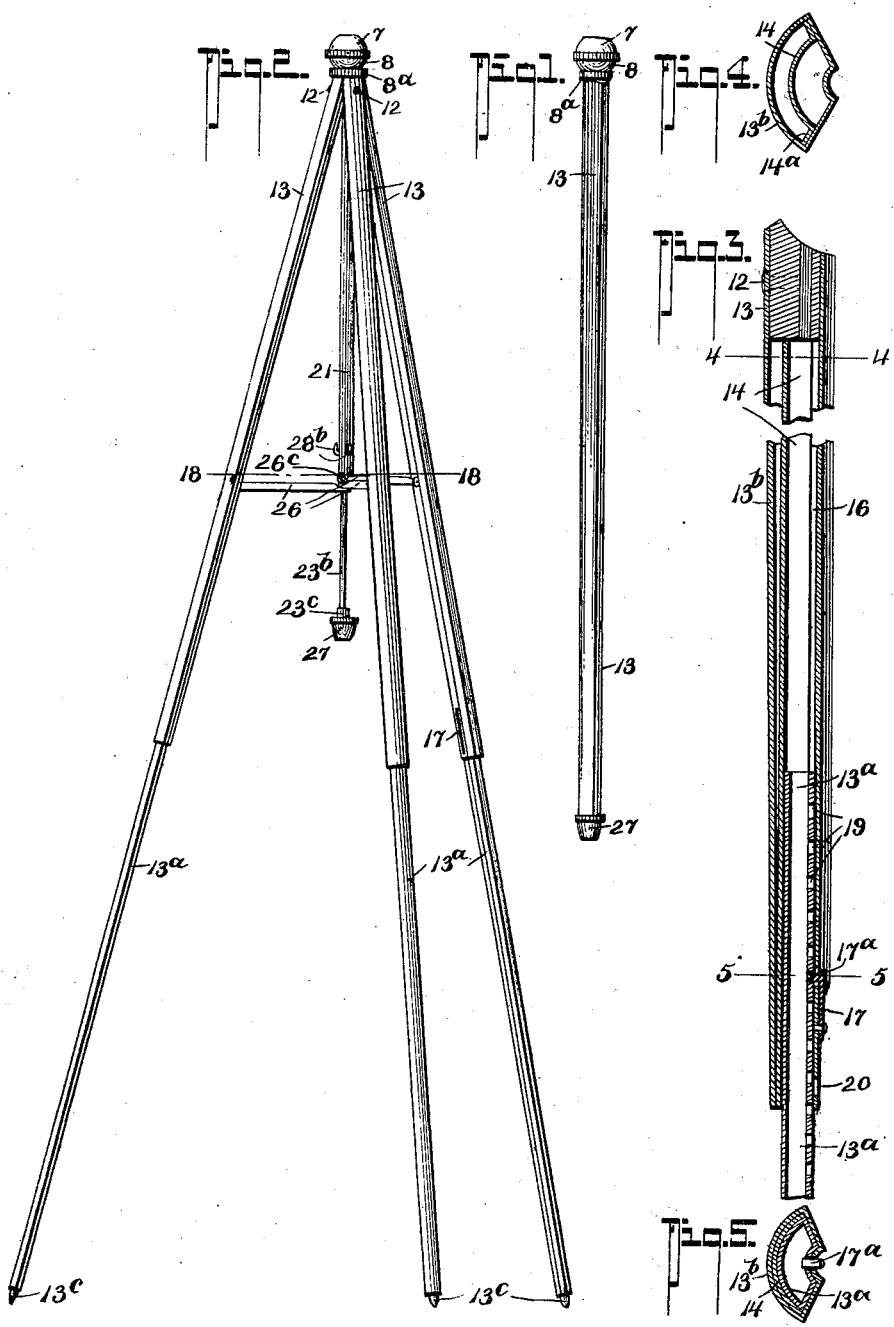

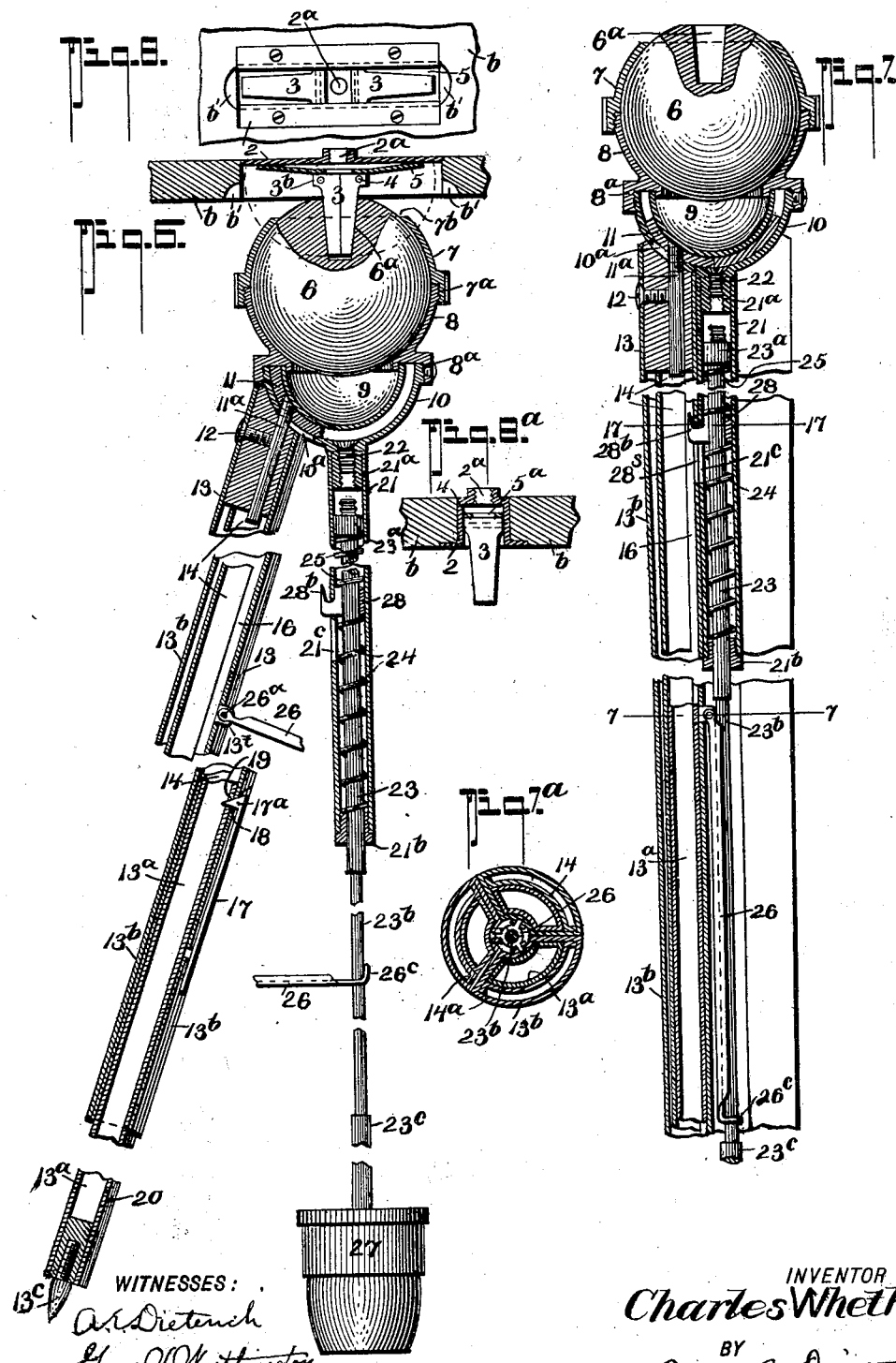

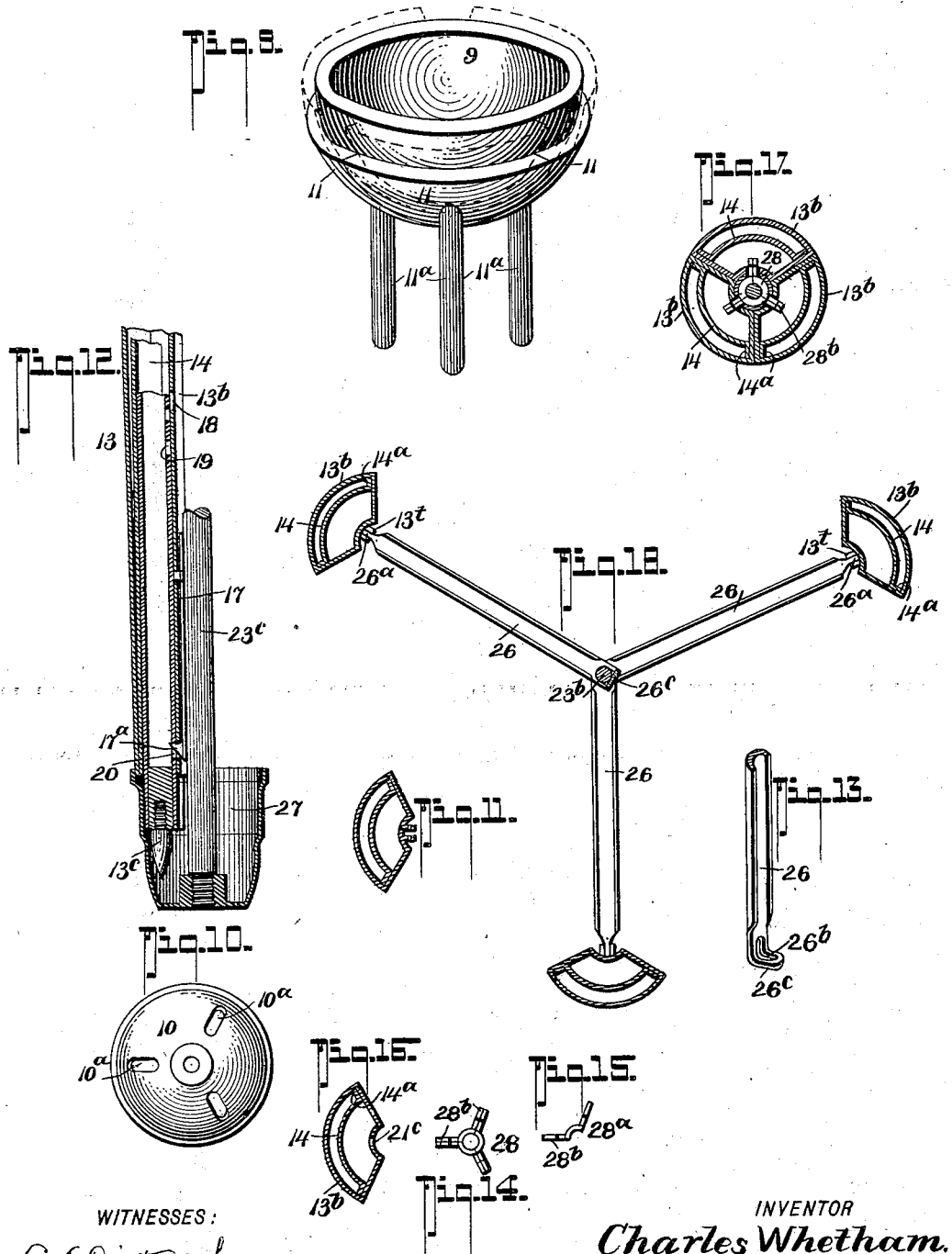

CHARLES WHETHAM, OF RUSKIN, CANADA.

PORTABLE TRIPOD.

SPECIFICATION forming part of Letters Patent No. 703,873, dated July 1, 1902.

Application filed August 28, 1901. Serial No. 73,517. (No model.)

*To all whom it may concern:*

Be it known that I, CHARLES WHETHAM, a citizen of the Dominion of Canada, residing at Ruskin, in the Province of British Columbia, Canada, have invented a new and useful Portable Tripod, of which the following is a specification.

My invention relates to an improvement in the design and construction of portable tripods suitable for any purpose where lightness, rapidity of opening and closing of the legs, and easy and accurate adjustment of the instrument or article to be mounted are of primary importance.

The construction of my tripod is fully illustrated in the accompanying drawings, in which—

Figure 1 shows it as packed for carrying. Fig. 2 is a side elevation of it with the legs extended ready for use. Fig. 3 is a longitudinal section of the upper length of one leg, showing the particulars of the telescopic device when the legs are made extensible. Figs. 4 and 5 are cross-sections of the same at the upper and lower ends, respectively. Fig. 6 is a vertical section, partly in elevation, of the central or body part of my invention, one of the legs, the means for attaching the leg to the head portion, and the mechanism for mounting the camera or other article directing the head for spreading the legs and for retaining said legs in a closed position when the tripod is packed. Fig. 7 is a similar view, the several parts being closed up. Fig. $7^a$ is a horizontal section on the line 7 7 of Fig. 7. Fig. 8 is an inverted plan view of the divided-stud devices for attaching a camera to the adjustable head of my improved tripod. Fig. $8^a$ is a transverse section of the devices shown in Fig. 8. Fig. 9 is an enlarged perspective view of the spherical members 9 and 11, hereinafter specifically referred to. Fig. 10 is an inverted plan view of the lower spherical member of the leg-hinge devices. Fig. 11 is a horizontal cross-section taken through the upper part of the telescopic leg adjacent to the spreader connection. Fig. 12 is a vertical section of the lower end of a telescopic leg when closed in, the spring-latch being shown adjusted to hold the leg to such position. Fig. 13 is a detail perspective view of the spreader member 26, hereinafter referred to. Figs. 14, 15, and 16 are detail views of the members 14, 28, and $28^a$, hereinafter explained. Fig. 17 is a horizontal section on the line 17 17 of Fig. 7. Fig. 18 is a horizontal section on the line 18 18 of Fig. 1.

As affording a quicker and more convenient attachment than the usual tripod-screw I have designed a square taper plug attachable to the camera or article to be mounted, fitting it into a similarly-shaped socket in the ball of the tripod-head, and to enable such a fastening to be used where it is desirable also to provide the means for using the ordinary tripod or mine, as may be preferred, I have designed the square plug illustrated, vertically divided into two equal parts which fold apart when not required and lie in a shallow recess, leaving clear a threaded aperture for the ordinary standard tripod-screw. The upper part of Fig. 6, Fig. 7, and Fig. 8 being referred to, it will be seen that the aperture $2^a$, threaded for the standard-screw, is at the bottom of a plate 2, which is recessed through the bottom $b$ of the camera or other article and attached thereto in any convenient manner. The divided square plug 3 is hinged within the recess of the plate 2 by the pins 4, which are far enough apart to leave a clear space for the entrance of the standard screw between the ends of 3 when folded back. A flat spring 5 within the recess bears on the outer square corners $3^b$ and holds the hinged halves 3 up or down, as desired. This spring has a hole $5^a$ in the middle to permit the passage of the screw attachment. Notches $b'$ allow the nails of finger and thumb to engage and pull together the two halves of the square plug 3.

A tapered socket-hole $6^a$ is provided in the ball-head 6 of my tripod and the ball or sphere 6 being inclosed between the hollow casing formed by 7 and 8 screwed together at $7^a$, the upper member 7 of which has an aperture $7^b$ to provide for the play of the ball under adjustment. The mounted article is thus permitted an ample directability.

Fitted to the lower part of the ball-joint casing 8 is a hemispherical bearing 9, and attached to the same casing by the screw-socket $8^a$ is the hemispherical bearing-piece 10. These are so fitted as to leave an intervening space between the convex surface of 9 and the concentric concave surface of 10, within which space are the triangular hinge-pieces 11, having the pins 11$^a$, which pins pass through the slots 10$^a$ provided, and thus form the connecting attachment of the tripod-legs. In order to have a steady firm hinge connection for the legs, it is desirable that these spherical triangles should have as large a bearing-surface as possible and that the upper edge of each piece should when at its extreme upward position bear against the upper edge of the recess in which it moves. Fig. 9 illustrates clearly the outline which these segments should have to obtain the most satisfactory results. The segments 11 are shown at their lowest position on the convex surface of 9, where the adjacent edges of each of the three pieces touch each other. The dotted lines on Fig. 9 show the same in the extreme upward position, in which the plane of their upper edges coincides with the upper edge of the hemisphere on which they bear. The legs 13 are connected to the triangular pieces by means of the pins 11$^a$ integral with them and which, passing through the slots 10$^a$ in 10, are removably fixed in the end of the upper portion of each leg by the screw 12. The upper end of each leg where it bears on the convex surface of 10 is shaped to conform to it and form a steady bearing.

The tripod-legs consist of three sections, each forming one-third of a complete circle, as clearly shown in Figs. 4, 5, 11, and 16, and each section has a concaved central edge, also forming one-third of a complete circle, whereby when the several legs are assembled or closed up a central circular bore is provided to receive the member 23$^c$, again referred to. These legs 13 may be hollow or solid and in one or two lengths, as preferred. When made in two lengths, the lower portion 13$^a$ slides telescopically within the upper 13$^b$, which must be hollow, while the lower may be hollow or solid, as desired. The drawings show the hollow construction in two lengths, closing into a tapered staff. (See Fig. 1.) In order that the lower length 13$^a$ may be steady within the tapered upper length 13$^b$ in any position, I place within the upper leg length 13$^b$ a piece 14, extending from top to bottom, the curved portion of which is bent to the radius of the outside of the lower length of the legs, while the edges 14$^a$ engage the side walls and inside of the outer arc of the upper length. These edges 14$^a$ must necessarily taper from a maximum at the top to nothing at the bottom, and when the solid upper end piece is inserted and fixed the internal piece 14 is firmly braced between the radial sides of the upper leg and the outer circle, by which a space 16 is formed, of uniform cross-section throughout the length, within which the lower leg length may slide freely and steadily. At the inner fluted side of the lower end of each upper leg on a flattened portion of the fluting is a spring-latch 17, rotatably riveted and having an inwardly-projecting beveled end 17$^a$, the perpendicular face of which is toward the rivet. This projecting end 17$^a$ passes through an aperture 18 in the inner fluted side of the upper leg and engages notches or apertures 19 in the inner fluted side of the lower leg. The lower leg is provided with these notches at various intervals, and when the spring-latch is turned so that the projecting end is uppermost the lower leg may be drawn out and the various notches or apertures will slide over the latch until the desired length is attained, but the lower leg will not push back unless the spring-latch is pulled out and reversed, which can be done with the finger-nail. When, however, the spring-latch is reversed, so that the projecting portion is downward, the lower leg may be pushed back until it is in position for closing the tripod, in which position the latch enters an aperture 20 in the lower leg and secures it until the latch is again reversed to permit of reëxtension. This latch is shown in position when the legs are extended for use in Figs. 3 and 6 and as when packed away in Fig. 12.

I will now describe the means by which the legs are automatically spread when desired and similarly closed and secured. At the center of the lower part of the hemispherical hinge-bearing 10 I attach the tube 21 by the screw 22, which is threaded into the bushing 21$^a$, fixed in the upper end of the tube. The length of the tube is approximately half that of the upper leg length, and in the lower end is screwed a bush 21$^b$, through which slides the stem 23. The upper end of the stem 23 is threaded to enter the lower part of the bushing 21$^a$, which receives the attaching-screw 22. Just below the threaded portion of the upper end of this stem 23 and fixed thereto is a collar 23$^a$, freely slidable in the tube 21, and between this collar and the lower bush 21$^b$ are spiral springs 24 and 25, separated by the hook-sleeve 28, to be described more fully hereinafter. Below the tube the stem 23 is reduced to a small diameter, as 23$^b$, and on this reduced portion are slipped the spreading-struts 26, while the stem is increased again, as 23$^c$, to the original diameter, and at the lower end has attached to it the cap-ferrule 27, which comes over and retains the ends of the legs when closed and shields the points 13$^c$, as shown in Figs. 1 and 12. The spreading-struts 26 are one-third of the tube 21 in cross-section, which gives them rigidity against flexure and permits of their folding up against the stem in the same space occupied by the tube 21 in the upper part. One end of each of these struts is bent around to form an eye and is hinged to about the middle of the upper part of the legs by a pin 26$^a$, between two lugs 13$^t$, bent out from the metal of the leg when made hollow and in any suitable manner when the leg is solid. The other end of each strut, which slides on the reduced stem, has an oval hole 26$^b$ punched in it, the minor axis of which is the diameter of the stem on which it slides and the major axis twice the same. It is thereafter bent up at right angles, as 26°, from the center of the length of this oval hole, (see Fig. 13,) so that these spreading-struts may either lie up close to the stem, as when packed, or stand at right angles to the same, as when the tripod-legs are spread for use.

In the operation of closing or packing the tripod, the legs being telescoped one within the other, the stem 23 is taken by the cap-ferrule 27 and pulled down against the resistance of the springs 24 and 25. The upper shoulder of the reduced stem 23$^b$ engages the ends 26$^c$ of the struts and draws the legs 13 together, and on the cap-ferrule 27 being released the springs 24 and 25 draw it up to and over the ends of the legs, holding them together. In order better to secure the legs together and prevent them springing apart at the middle of the length when packed, I adopt the hook-sleeve 28, previously referred to. This is composed of three segments 28$^a$, stamped from thin metal to the shape shown in Fig. 14, each end of which has an upwardly-directed hook end 28$^b$. (Shown in elevation in Fig. 6.) About one-third of the total spring length from the lower bushed end of the tube and in the position the hook-sleeve is to occupy are three elongated slots 21$^c$ of a length about twice the hook-sleeve depth and spaced opposite the axial center line of each leg. Each separate piece of the hook-ring can thus be inserted through the upper part of a slot 21$^c$ and dropped down into position surrounding the center stem and when complete forms a ring between the two springs 24 and 25, and the adjacent hook ends of each piece form the three hooks 28$^b$, projecting through the slots 21$^c$. In each leg opposite the lower position of the hooks is an aperture 13$^s$, so that when the stem is pulled down to close the tripod the hook-ring is forced down to the lower position in the slot 21$^c$, and on the release of the spring to force the cap-ferrule over the leg ends the hooks, having entered through the apertures 28$^s$, engage the thickness of the inner wall of the upper leg portion, draw the legs together at the center of their length, and retain them there. On pulling the stem down to release the legs from the ferrule the hooks are disengaged and the legs are free to extend.

It will be seen that I have invented a tripod which has many novel features designed to simplify very much the operations of spreading the tripod and mounting and directing the camera or other article and also of repacking the same for transit. When so packed, it is compact, portable, and non-conspicuous, in which it differs widely from the majority of such appliances in common use. I have carefully studied to design its parts that they may be readily made in stamped and drawn metal, with the majority of the work adapted to automatic machinery for finishing. Although elaborate to describe, its mechanism is extremely simple and not liable to derangement.

Another advantage gained by my construction of parts, especially the means for connecting the two leg-sections, is that the space between the outer shell of the tripod-leg and its inner bushing not only provides for a uniform section within which the lower member may slide, but also prevents a dent or bruise of the outer shell affecting the free sliding of the inner or lower leg length.

Having now particularly described my invention, what I claim as new, and desire to be protected in by Letters Patent, is—

1. In a tripod of the character described, the combination with a head having a tapered socket; of a supporting member having a tapered plug, said plug consisting of two pieces each independently hinged to swing up into the same horizontal plane and down into a vertical plane with their contiguous edges abutting, whereby to provide a member adapted to fit the tapered socket and means on the supporting member for maintaining the two plug members at their different adjusted positions, substantially as shown and for the purposes described.

2. In combination with a tripod-head, a hinged leg, having an outer hemispherical convex surface depending from the base of the head; an inner hemispherical shell at a suitable distance from the same, and having its concave interior and convex exterior surfaces concentric with the first-named convex surface; the said outer hemispherical shell having three elongated openings or slots; three hinge-pieces, said hinge-pieces being sections of a hemispherical shell of the thickness of the space between said hemispherical surfaces, each hinge-piece having an outwardly-projecting pin passing through the slots; tripod-legs attached to said projecting pins, and having their upper ends shaped to conform to the outer spherical hinge-surface, all being arranged substantially as shown and for the purposes described.

3. In a tripod of the class described, legs made in two lengths, the lower telescoping within the upper; a solid end in the upper end of each upper length, hinged to the head; a longitudinal division-plate in the upper length, preserving a uniform tube-section for the lower length to slide within; a pivoted spring-latch adapted to check the upward movement of the lower length, within the upper leg length, but allowing free downward movement, such latch being reversible on its pivot so as to resist downward, while allowing free upward movement; apertures in the upper length above and below the pivot to allow the latch to engage the lower length within the upper tubular length, in either position of the latch, and means in the lower length to engage and retain the lower length, when telescoped within the upper length, all substantially as described.

4. In a tripod as described, having hollow telescopic legs working on a hemispherical hinge-surface, in combination, a depending tubular spring-casing attached to the under side of the hinge-surface, and approximately half the length of the upper leg member; an internally-screwed sleeve fixed in the upper end of this tube; a screw in the lower center of the outer hinge-surface, countersunk on the inside, to attach, by the screwed sleeve, the tube to the head; a bushing screwed in the lower end of the spring-tube; a stem sliding within such bushing and having at its upper end a screwed portion to engage the lower half of the screwed sleeve, and just below such screwed portion a fixed collar slidable within the tube; a spiral spring surrounding the stem and within the tube; a reduced portion on the stem exterior to the tube, having a shoulder at the change of diameter, a spreader device having apertured end members, said reduced portion passing through the apertures in the ends of the spreader; a shoulder below the spreaders and a bottom ferrule secured to slide over the ends of the legs when closed, all substantially as described.

5. In a tripod, telescopic leg members, a center stem, a spreader-strut hinged at one end to about the middle of each upper leg length and having the other end flattened and provided with an oval hole, the minor axis of which is the diameter of the center stem on which it slides, and the major axis twice that; said strut having a right-angled upward bend across the center of the oval hole, adapted to allow the struts when free on the center stem to assume positions parallel to or at right angles to it, and shoulders on the center stem adapted to engage the ends of the spreader-struts and push them up or pull them down, as desired.

6. A tripod of the class described, comprising leg members each formed of telescopic upper and lower sections, a central stem, a spreader-strut hinged to each upper leg-section, said spreader having its inner ends flattened and said flattened ends each having an oval aperture, the width and length of which is respectively the diameter and twice the diameter of the reduced portion of the central stem which it engages and slides in, and the said ends also having upwardly-bent right-angle portions, substantially as shown and for the purposes described.

7. In a tripod having inwardly-closing legs, a device for holding and releasing the legs consisting of a spring-controlled central stem having an end ferrule to secure the leg ends; a hook-sleeve actuated by such spring having equally-disposed outwardly-projecting and upwardly-directed hooks; a spring-casing having slots through which such hooks project and have a limited vertical movement, and means on each leg whereby the hooks may engage and retain the legs to the central stem and close to one another.

8. In a tripod of the class described, a headpiece having a socket, a member adapted to be attached to the article to be held, a tapered plug consisting of half-sections, each being independently pivoted to the said member to swing outward and against the said member, and to close toward and against each other, and pendent from said member whereby to adapt the plug to enter the socket in the headpiece, as set forth.

9. In a tripod of the character described, the combination with the socketed headpiece; of the object-holder b, the tapered plug-sections 3 hinged on the lower side of the holder to swing upward and outward from each other to a horizontal position and downward against each other to a vertical position, and means for sustaining said sections in either position, as set forth.

10. In a tripod of the character described, a headpiece having a pendent convex surface, a shell concaved on a plane concentric with the pendent head-surface, and having elongated openings, hinge-pieces slidable between the convexed and concaved members, said pieces having pins projected through the openings in the shell, and tripod-legs secured to the said pins, as set forth.

11. In a tripod of the character described, a headpiece having a pendent convexed inner shell, an outer shell concentric with the inner shell, and having longitudinally-elongated openings, members movably held between the inner and outer shells, and having studs or pins projected through the openings in the outer shell, tripod-legs detachably secured to the projecting ends of said pins, the attached ends of said legs being shaped to snugly bear against the outer shell, all being arranged substantially as shown and described.

12. In a tripod or supporting apparatus of the character described, the combination with the headpiece, the spherical bearing and the attaching members for joining the legs to the head, slidable on the spherical bearing; of leg members, each having a solid end adapted to detachably connect with the slidable members, said legs consisting of two lengths telescopically joined, and a reversible spring-latch device on the leg members for holding the lower leg-section to its closed-in or extended position, for the purposes specified.

13. In an apparatus as described, the combination with the head, the hinged legs and the centrally-pendent tubular stem; of spreader-struts each consisting of a body portion concaved in cross-section adapted to close up against the tubular stem, one end of said struts having a hinged connection with the legs, the other end having a pivotal and slidable connection with the tubular stem, all being arranged substantially as shown and for the purposes described.

14. In combination with the head of a tripod of the class described, a square tapered socket in the head; a plug or stem designed to fit such socket and composed of two pieces contiguous in a vertical plane through the axis of the plug; a hinge-pin at the outer edge of the base of the taper in each piece; a suitable mounting for the same, having a recess in the walls of which the hinge-pins pivot; and a flat spring in the bottom of the recess, bearing on the square outer corners of the base of the plug members and having an aperture in the center of the recess, substantially as described.

In testimony whereof I have signed my name to this specification in the presence of two subscribing witnesses.

CHARLES WHETHAM.

In presence of—
 ROWLAND BRITTAIN,
 ELLICE WEBBER.